United States Patent
Doppler et al.

(10) Patent No.: US 11,193,566 B2
(45) Date of Patent: Dec. 7, 2021

(54) ACTUATOR INCLUDING A THREADED SPINDLE AND PLASTIC ELEMENT

(71) Applicant: Aktiebolaget SKF, Gothenburg (SE)

(72) Inventors: Manuel Doppler, Wehr (DE); Emmanuel Eyraud, Pratteln (CH); Marcel Soltermann, Sankt Pantaleon (CH)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 16/267,419

(22) Filed: Feb. 5, 2019

(65) Prior Publication Data

US 2019/0264787 A1 Aug. 29, 2019

(30) Foreign Application Priority Data

Feb. 27, 2018 (DE) .......................... 102018202926.1

(51) Int. Cl.
*F16H 25/20* (2006.01)
*F16D 125/40* (2012.01)

(52) U.S. Cl.
CPC ..... *F16H 25/2015* (2013.01); *F16D 2125/40* (2013.01)

(58) Field of Classification Search
CPC ............ F16H 25/2418; F16H 25/2409; Y10T 74/18576; Y10T 74/1527; Y10T 74/19702; Y10T 74/19902; Y10T 74/18704; Y10S 411/903
USPC ..................................................... 29/525.12
See application file for complete search history.

(56) References Cited

U.S. PATENT DOCUMENTS

| | | | | |
|---|---|---|---|---|
| 2,832,391 A * | 4/1958 | Clark | ...................... | F16B 39/28 411/303 |
| 3,468,212 A * | 9/1969 | Tinnerman | .............. | F16B 39/34 411/436 |
| 4,482,368 A * | 11/1984 | Roberts | .............. | B01D 46/0043 411/303 |
| 6,041,671 A * | 3/2000 | Erikson | ............... | F16H 25/2006 411/231 |
| 6,454,504 B2 * | 9/2002 | Duffy | ...................... | F16B 39/34 411/304 |
| 7,152,496 B2 * | 12/2006 | Chen | ................... | F16H 25/2472 74/89.26 |
| 7,510,163 B2 * | 3/2009 | Schlitzkus et al. | .... | F16M 13/00 248/635 |
| 7,731,464 B2 * | 6/2010 | Nagayama | .............. | F16B 37/12 411/178 |

(Continued)

FOREIGN PATENT DOCUMENTS

DE 102010010486 A1 * 9/2011 .............. F16B 39/34
EP 2138729 A1 * 12/2009 .............. F16B 31/02

*Primary Examiner* — Bobby Rushing, Jr.
(74) *Attorney, Agent, or Firm* — Laurence A. Greenberg; Werner H. Sterner; Ralph E. Locher

(57) ABSTRACT

An actuator includes a threaded spindle and an internally threaded component screwed onto the threaded spindle. The component includes a plastic element having a first axial end and a second axial end and an interior having a width and a radially inwardly projecting flange at the first axial end, and the flange has an inner diameter less than the width of the interior. A metal element, such as a nut, is fixedly mounted in the interior of the plastic element, and the internal thread of the nut has a maximum diameter greater than the inner diameter of the flange.

17 Claims, 4 Drawing Sheets

(56) References Cited

U.S. PATENT DOCUMENTS

| | | | | |
|---|---|---|---|---|
| 8,286,519 B2 * | 10/2012 | Duits et al. | ............... | F16H 3/06 74/89.23 |
| 8,931,137 B2 * | 1/2015 | Daniel et al. | ........... | F41C 27/00 16/2.1 |
| 9,163,897 B1 * | 10/2015 | Estridge et al. | .......... | F41B 5/18 |
| 2006/0230850 A1 * | 10/2006 | Klein et al. | ............. | F16H 27/02 74/89.23 |
| 2015/0122065 A1 * | 5/2015 | Oka | ........................ | F16H 25/22 74/424.81 |

* cited by examiner

ACTUATOR INCLUDING A THREADED SPINDLE AND PLASTIC ELEMENT

CROSS-REFERENCE

This application claims priority to German patent application no. 10 2018 202 926.1 filed on Feb. 27, 2018, the contents of which are fully incorporated herein by reference.

TECHNOLOGICAL FIELD

The disclosure is directed to an actuator having a threaded spindle and a component that includes an internal thread that is screwed onto the threaded spindle.

BACKGROUND

An actuator including a threaded spindle and a nut screwed onto the threaded spindle is known. The nut is attached to the threaded spindle using a lock screw. Alternatively the nut can also be under-dimensioned for the thread of the threaded spindle and include a slot. A design of an actuator is known in which two nuts are screwed onto the threaded spindle such that they contact each other. In addition, locking nuts, such as Nylstop® securing nuts, are known.

SUMMARY

As aspect of the disclosure involves in particular achieving a high efficiency.

Another aspect of the disclosure is an actuator including a threaded spindle and a component that includes an internal thread that is screwed onto the threaded spindle.

According to embodiments of the disclosure, the component includes at least one region that is comprised of plastic, in particular of a hard plastic, and which contacts the threaded spindle. In particular, a very compact, very cost-effective, and easy-to-manufacture design can be achieved. Furthermore, it can in particular be achieved that the component is screwable onto the threaded spindle in a simple manner and nonetheless maintains its position relative to the threaded spindle during operation of the actuator. In particular the component can play the role of a safety end stop as defined in the IEC 60601-1 standard.

Further advantages arise from the following description of the drawings. An exemplary embodiment of the disclosure is depicted in the drawings. The drawings, the description, and the claims contain numerous features in combination. The person skilled in the art will also advantageously consider the features individually and combine them into further meaningful combinations.

DETAILED DESCRIPTION

Figure 1:
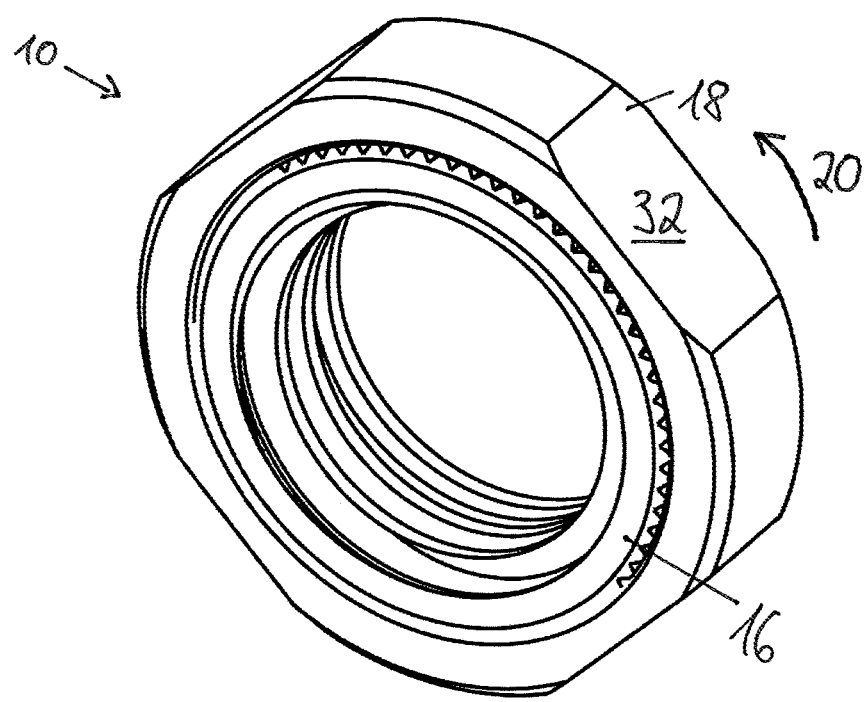
FIG. 1 is a perspective view of a component comprising a metal element and a plastic element according to the present disclosure.
Figure 2:
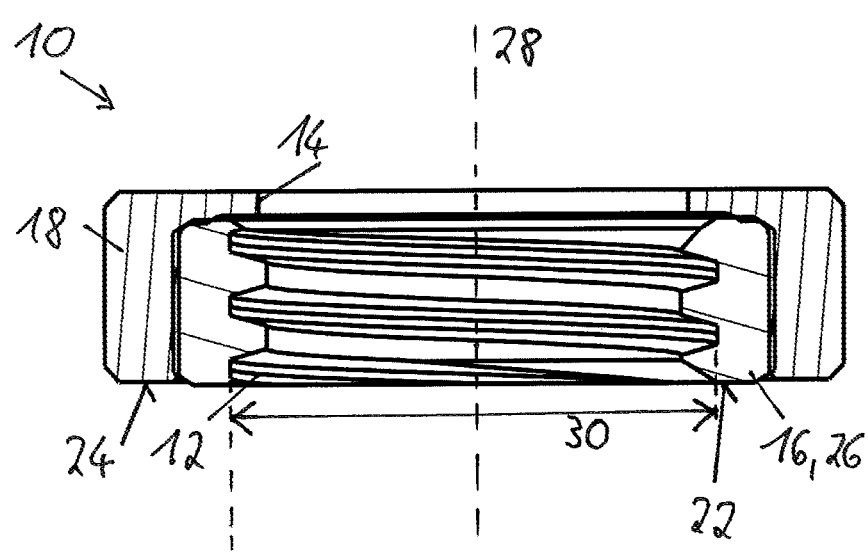
FIG. 2 shows a cross-section of the component of FIG. 1 divided into two halves.
Figure 3:
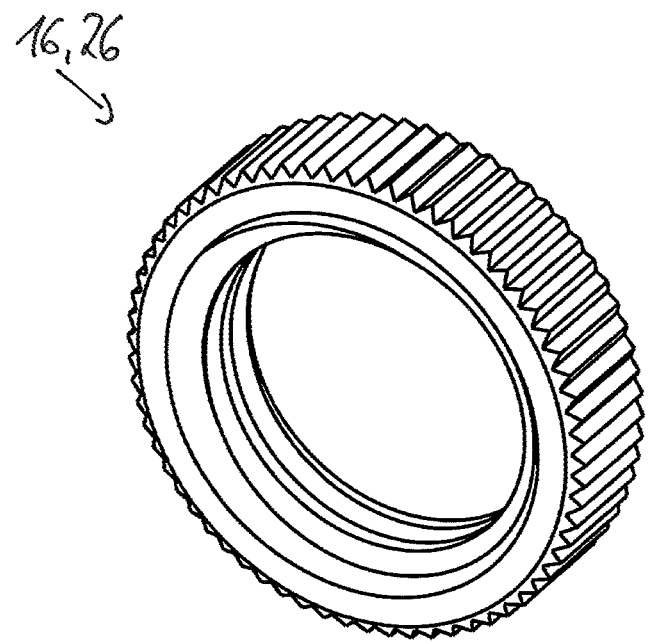
FIG. 3 is a perspective view of the metal element of the component.
Figure 4:
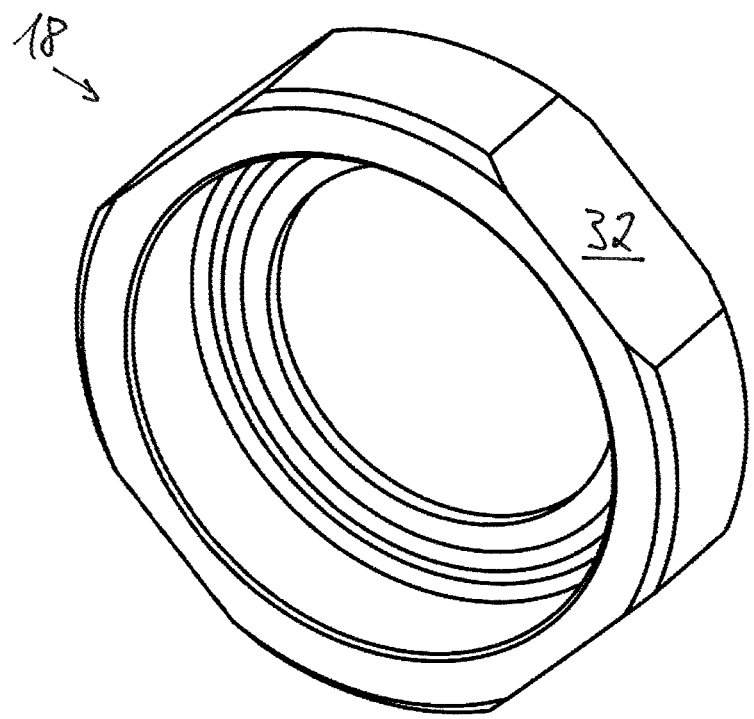
FIG. 4 is a perspective view of the plastic element of the component.
Figure 5:
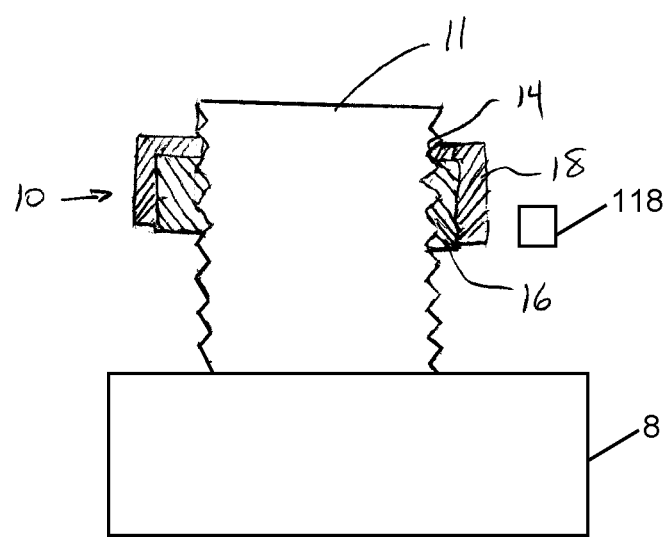
FIG. 5 is a sectional side elevational view of the component mounted on a threaded spindle.
Figure 6:
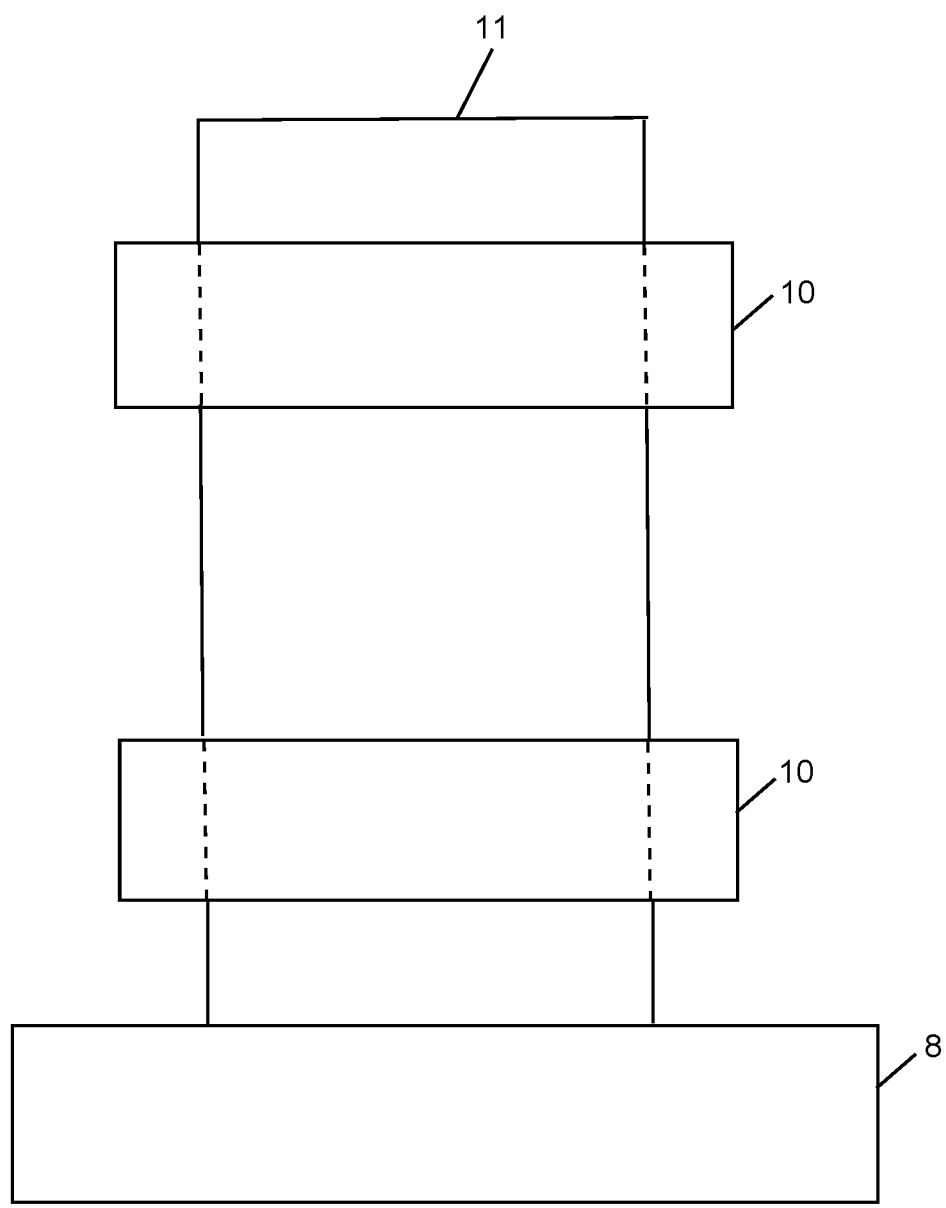
FIG. 6 is a schematic view of components mounted on a threaded spindle.

FIGS. 1 and 2 show a component 10 according to the present disclosure, which in the installed state is screwed onto a threaded spindle 11 of an actuator 8 (FIG. 5), in particular of a lifting actuator. Such lifting actuators are known and are not described further herein. The component includes a metal element 16 that is configured as a nut 26, and a plastic element 18 in which the metal element 16 is seated. In the installed state an internal thread of the nut 26 is screwed onto a threaded spindle 11. The plastic element 18 includes an annular region 14 that contacts the threaded spindle 11 in the installed state. In a state in which the component is removed from the threaded spindle 11, the region 14 is deformed in comparison to a state in which the component is screwed onto the threaded spindle 11. In a cross-section (FIG. 2), the region is configured as a radially inward extending flange, that is, it has the form of a radially inward extending flange. On its radially outer region the metal element 16 includes gear teeth that extend over the entire circumference of the metal element 16. The metal element 16 is pressed-in into the plastic element 18 and the gear teeth help to hold the metal element in a fixed orientation relative to the plastic element 18 and substantially prevent relative circumferential movement.

With a screwing-on of the component onto the threaded spindle 11 the nut rotates about a central axis 28. The distance of the region 14 from the central axis is smaller than the outer diameter 30 of an internal thread 12 of the nut 26. The plastic element 18 contacts with its surface more than 10% of the total surface of the metal element.

On its radially outer surface the plastic element includes flat areas 32 that can be gripped by a wrench such that by moving the wrench the component can be screwed onto the threaded spindle 11. Here the plastic element 18 transmits a force in the circumferential direction 20 onto the metal element 16. An axial-side end surface 22 (FIG. 2) of the metal element is farther removed from a center of gravity of the component than an axial-side end surface 24 of the plastic element, wherein the two end surfaces are disposed on the same side of the component. That is, the metal element 16 projects axially, at least slightly, from the plastic element 18. This has the advantage that, if the component impacts against a flat surface, the plastic element 18 is not pressed away from the metal element 16.

The region 14 ensures that a position of the component is fixed relative to the threaded spindle 11 during an operating of the actuator 8. Furthermore, a switching-off of the drive of the actuator 8 is realized using the component, and specifically by the component actuating a switch 118 when it reaches its specific position relative to the housing of the actuator 8; the switch 118 deactivates the drive. If the switch 118 fails, the component causes a stoppage in a mechanical manner of the threaded spindle 11 relative to the housing of the actuator 8, which is particularly important for medical actuators since two shut-off mechanisms are the rule here. The end positions for both shut-off mechanisms are simultaneously changed by screwing the component, which in particular reduces the risk of accident with operating tables.

Instead of the mentioned switch an end position of the threaded spindle 11 can also be marked by the component impacting against the housing of the actuator 8, whereby an overcurrent is generated in the actuator 8, which signals the electronics of the actuator 8 that an end position is reached, which end position is then stored in a memory of the actuator 8.

The component is screwed-on onto a first end of the threaded spindle 11. A further identical component 10 is screwed-on onto the second end of the threaded spindle 11. The maximum- and minimum-position of the actuator 8 and the total travel of the actuator 8 are very precisely adjustable by a screwing of the two components 10 on the threaded spindle 11, which is particularly useful for compensating tolerances.

In the present case the nut 26 is relatively short, which saves installation space.

When the component is screwed onto the threaded spindle 11, the plastic element and the metal element are held in position relative to each other by the thread of the threaded spindle 11. When the component is screwed-on onto the threaded spindle 11 a special tool is used in order to ensure that the plastic element and the metal element remain in position relative to each other.

Since both the metal element and the plastic element are very cost-effective, the entire component is also extremely cost-effective.

The plastic element can be comprised of hard plastic.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved actuators.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

8 Actuator
10 Component
11 Threaded spindle
12 Internal thread
14 Region
16 Metal element
18 Plastic element
20 Circumferential direction
22 End surface
24 End surface
26 Nut
28 Central axis
30 Outer diameter
32 Flat area

What is claimed is:

1. An actuator comprising:
   a housing;
   a threaded spindle;
   a drive configured for moving the threaded spindle relative to the housing during operation of the actuator; and
   an internally threaded component screwed onto the threaded spindle,
   wherein the component includes a plastic element and a metal element mounted in the plastic element, the plastic element has at least one annular region comprised of plastic in contact with the threaded spindle, the annular region is configured to fix a position of the component relative to the spindle during operation of the actuator, the metal element is configured for providing an interference-fit force transmission in a circumferential direction of the plastic element.

2. The actuator according to claim 1, wherein the plastic element is configured to provide a force transmission onto the metal element in a circumferential direction of the metal element in an interference-fit manner.

3. The actuator according to claim 1, wherein the metal element is pressed-in into the plastic element.

4. The actuator according to claim 1, wherein an axial-side end surface of the metal element is farther removed from a center of gravity of the component than an axial-side end surface of the plastic element, which is disposed on a same side of the component as the axial-side end surface of the metal element.

5. The actuator according to claim 1, wherein an axial end of the metal element projects beyond an axial end of the plastic element.

6. The actuator according to claim 1, wherein the annular region is deformed when the component is removed from the threaded spindle in comparison to a state when the component is screwed onto the threaded spindle.

7. The actuator according to claim 1, wherein the annular region is a radially inward extending flange.

8. The actuator according to claim 7, wherein the radially inward extending flange defines an axial end face of the internally threaded component.

9. The actuator according to claim 1, wherein the component is screwable onto the threaded spindle using a wrench.

10. The actuator according to claim 1, wherein the actuator is a lifting actuator.

11. The actuator according to claim 1, wherein the component is configured to switch off the drive upon reaching a specific position relative to the housing.

12. The actuator according to claim 1, further comprising a switch for deactivating the drive, the switch being arranged for being actuated by the component.

13. The actuator according to claim 12, wherein the component is configured to cause a mechanical stoppage of the threaded spindle relative to the housing when the switch fails.

14. The actuator according to claim 1, wherein the component is screwed-on onto a first end of the threaded spindle, and the actuator includes a further identical component screwed-on onto a second end of the threaded spindle, the component and the further component define the maximum and minimum position of the spindle relative to the housing.

15. An actuator, comprising:
a housing;
a threaded spindle;
a drive configured for moving the threaded spindle relative to the housing during operation of the actuator;
a component including a plastic element and a metal element mounted in the plastic element, the metal element being configured as a nut that has a central axis around which the nut rotates with a screwing-on onto an external thread, wherein the plastic element includes at least one annular region whose distance from the central axis is smaller than the outer diameter of an internal thread of the nut, the annular region is configured to fix a position of the component relative to the spindle during operation of the actuator, wherein the plastic element contacts at least 10% of a total surface of the nut, the at least one annular region is configured for contact with the threaded spindle of the actuator, and the metal element being configured for providing an interference-fit force transmission in a circumferential direction of the plastic element.

16. The actuator according to claim 15, wherein the plastic element has a first axial end and a second axial end and an interior having a width and a radially inwardly projecting flange at the first axial end, the flange having an inner diameter less than the width of the interior, the metal element is fixedly mounted in the interior of the plastic element, the metal element defines a nut having the internal thread, the internal thread having a thread maximum diameter and a thread minimum diameter, wherein the flange inner diameter is less than the thread maximum diameter.

17. The actuator according to claim 16, wherein an external surface or the nut includes a plurality of gear teeth cutting into an internal surface of the plastic element.

* * * * *